UNITED STATES PATENT OFFICE.

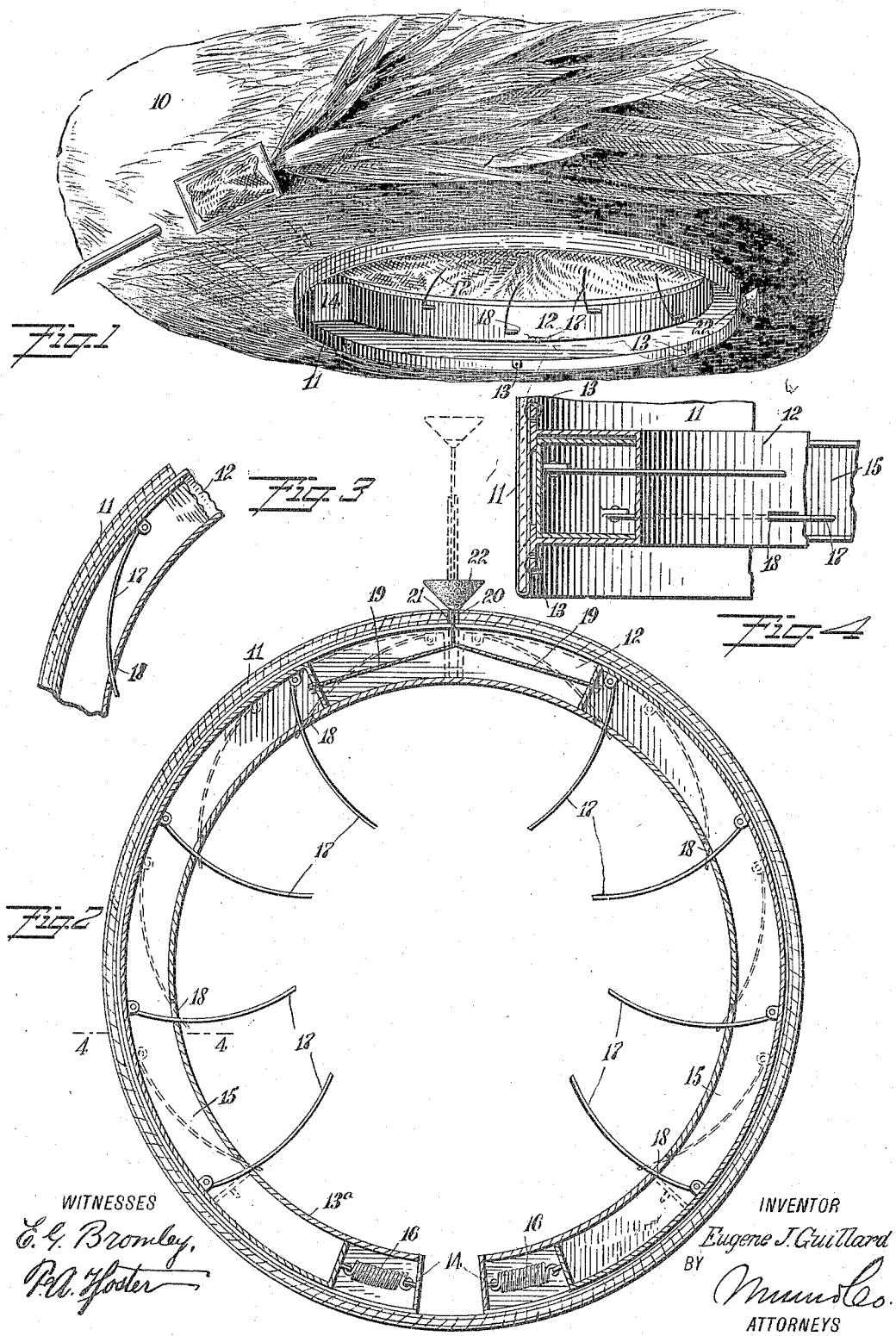

EUGENE J. GUILLARD, OF NEW YORK, N. Y.

HAT-HOLDER.

957,770.  Specification of Letters Patent.  Patented May 10, 1910.

Application filed October 12, 1909. Serial No. 522,310.

*To all whom it may concern:*

Be it known that I, EUGENE J. GUILLARD, a citizen of the United States, and a resident of the city of New York, borough of Brooklyn, in the county of Kings and State of New York, have invented a new and Improved Hat-Holder, of which the following is a full, clear, and exact description.

My invention relates to hat holders and has for an object to provide a hat holder adapted to be secured to a hat, and removably hold the same comfortably and securely upon the head of the wearer.

An embodiment of my invention comprises a casing, adapted to be secured to a hat, having therein spring controlled slides, provided with holding members guided on the inner rim of the said casing, the action of the said holding members being substantially controlled by manually operated means connected with the said slides in the said casing.

A further embodiment of my invention partakes of a peripheral casing adapted to be spread, having therein spring controlled slides provided with pins pivotally secured to the said slides and projecting inwardly through apertures in the said casing, the distance of movement of the said slides being controlled by manually operated means connected to the said slides and located exterior of the said casing.

My invention still further embodies novel features of construction, as will be hereinafter more fully described and specified.

Reference is to be had to the accompanying drawings, in which similar characters of reference denote corresponding parts in all the views, and in which—

Figure 1 is a perspective view of my invention, as applied to a hat; Fig. 2 is a sectional plan view of my invention, disclosing the various operative parts in their initial positions, the dotted lines showing the said parts in their semi-final positions; Fig. 3 is a sectional plan view of a part of my invention showing a slide and pin pivotally connected thereto, and Fig. 4 is a sectional view of my invention taken on the line 4—4 in Fig. 2.

A hat 10 is provided, having fastened on the inner rim 11 thereof a hollow casing 12, secured to the hat 10 by means of suitable holding members 13 on the casing 12. The casing 12 comprises a rectangularly shaped portion 13ª bent in the form of a ring, the ends of the said portion 13ª being spaced apart and having closures 14 therein, as clearly shown in Fig. 2. Segmental slides 15 are provided, adapted to be moved to and fro in the casing 12, the said slides having springs 16 connected to one end of the same, the said springs 16 being in turn secured to the closures 14. Suitable pins 17 are pivotally secured to the said slides on the inner side thereof, the said pins being staggered and adapted to project inwardly through apertures 18 in the rim of the casing 12. Cords 19 are attached to the other ends of the slides 15 and terminate in a single cord 20 passed through an aperture 21 in the casing 12, the said cord 20 being fastened to a handle 22.

When it is desired to wear the hat 10, the handle 22 is grasped and an outward pull exerted thereon causes the slides 15 to slide in the casing 12 toward each other, thereby causing the pins 17 to enter the casing 12, as is shown by dotted lines in Fig. 2 and also in Fig. 3. Still holding the handle 22 to keep the pins in the position shown in dotted lines in Fig. 2, the hat is placed upon the head of the wearer and the handle 22 is released, thus causing the slides 15, pulled by the springs 16, to slide into a position shown in Fig. 1, similar to the previous initial position of the same, and the pins 17 are then forced inwardly through the apertures 18 in the casing, into the hair of the wearer, thus holding the hat comfortably in place on the head. To remove the hat, the operation performed is substantially the same as when the hat is placed upon the head, as heretofore described.

It will be understood that my invention can be used on various forms and structures of hats, and that the casing 12 can be spread outwardly to accommodate larger sized hats or pressed together in order that the same can be fitted in smaller sized hats.

It will be further understood that my hat holder dispenses with the use of hat pins, now generally used to secure hats on the head; and it will be still further understood that I do not limit myself to the precise construction as shown in the drawings, the scope of my invention being set forth in the appended claims.

Having thus described my invention, I claim as new and desire to secure by Letters Patent:

1. In a hat holder, a hollow ring-shaped casing adapted to be secured to a hat, segmental slides mounted to move in the said casing, springs secured to one end of each of the said slides with the other ends of the said springs secured to the said casing, pins pivotally staggered, connected to the said slides, and flexible means secured to the other ends of each of the said slides and extending to the outside of the hat, the said means being adapted to operate the said slides to move the said pins in and out of the casing.

2. In a hat holder, a hollow ring-shaped casing adapted to be secured to the inner peripheral surface of a hat, and the said casing having alternately-disposed apertures therein on the inner side of the casing, segmental slides mounted to move in the said casing, springs secured to the said slides and the said casing, pins pivotally staggered, connected to the said slides and adapted to project inwardly through the said apertures in the said casing, and externally controlled means, connected with the slides, for moving the said pins in and out of the said casing.

3. In a hat holder, a hollow ring-shaped casing capable of being spread, adapted to be fastened to a hat, spring-controlled segmental slides in the said casing, pins pivotally staggered connected to the said slide and projecting inwardly through apertures in the said casing, and manually operated external means connected with the said slides for operating the same.

In testimony whereof I have signed my name to this specification in the presence of two subscribing witnesses.

EUGENE J. GUILLARD.

Witnesses:
F. A. HOSTER,
PHILIP D. ROLLHAUS.